A. I. AMBLER.
RAILROAD CAR BRAKE AND MEANS FOR OPERATING THE SAME.
No. 35,408. PATENTED MAY 27, 1862.
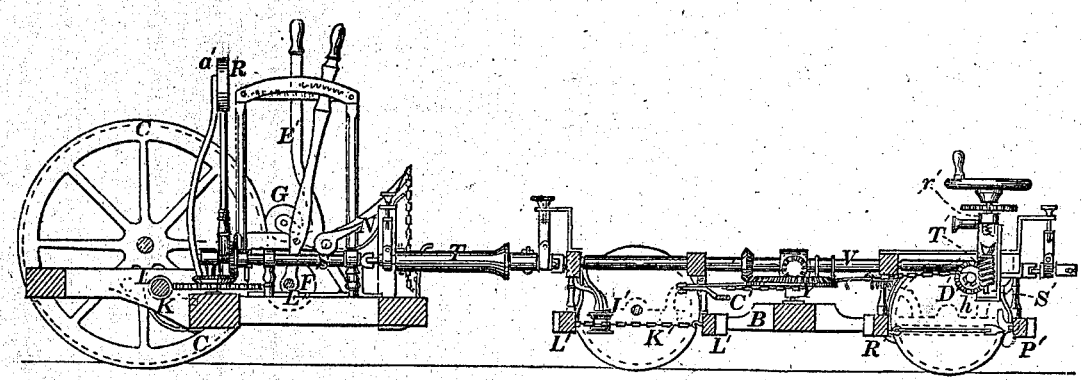

UNITED STATES PATENT OFFICE.

A. J. AMBLER, OF MILWAUKEE, WISCONSIN, ASSIGNOR TO HIMSELF, R. N. AMBLER, AND WARRICK MARTIN.

RAILROAD-CAR BRAKE.

Specification of Letters Patent No. 35,408, dated May 27, 1862.

*To all whom it may concern:*

Be it known that I, A. J. AMBLER, of Milwaukee, in the county of Milwaukee and State of Wisconsin, have invented a new and improved railroad-car brake, together with an improved means for operating the same, and which I term a "bur or friction-wheel brake;" and I do hereby declare that the following is a full, clear, and exact description of the same, reference being had to the accompanying drawings, making a part of this specification, in which—

Figure 1, is a side sectional view of the running gear of a locomotive and car with my invention applied to them; $x$, $x$, Fig. 2 indicate the plane of section. Fig. 2, is a plan or top view of the same, a part being horizontally bisected as indicated by the line $y$, $y$, Fig. 1. Fig. 3, is a section of a portion of the same, taken in the line $z$, $z$, Fig. 1. Fig. 4, is a section of a portion of the same, taken in the line $x'$, $x'$, Fig. 2. Fig. 5, is a detached sectional view showing a modification of a portion of the same. Fig. 6, is a detached view of an indicator pertaining to the invention. Fig. 7, is a section of Fig. 3, taken in the line $y'$, $y'$.

Similar letters of reference indicate corresponding parts in the several figures.

The object of this invention is to obtain a car-brake which may be placed under the complete control of the engineer and be capable of being operated at will at a maximum pressure or to any degree below the same to the minimum; and, at the same time be capable of being operated from the cars by brakemen like an ordinary car-brake. All the brakes of a series of cars or a train, being operated simultaneously by the engineer and all of them or any one of them separately by the brakemen.

The invention also has for its object the indicating of the precise position of the brakes at any point of their movement to serve as a guide to the engineer and brakemen in adjusting and operating the same.

To enable those skilled in the art to fully understand and construct my invention I will proceed to describe it.

A, represents the framing of a locomotive and B, the framing of a car track.

C, C', are the driving wheels of the locomotive and D, is an upright frame attached to one side of the locomotive framing A, having two levers E, E', connected to it by fulcrum pins $a$, $a$. The lower end of lever E, forms the bearing for a shaft E'', which is provided with a friction wheel F, and the lever E', is provided with a friction wheel G. The wheel F, is above the wheel G, and each lever E, E', has a spiral spring H, connected with it which springs have a tendency to keep the friction wheels free from each other and also from the driving wheel C, which is in line with them.

The shaft E'', is provided with a universal joint $b$, as shown in Fig. 2, and on said shaft beyond its fixed bearing $c$, on the framing A, there is placed a pulley $d$, around which a band I, passes, said band also passing around a pulley J, on a shaft K, which is also provided with a universal joint $e$, and has a screw L, upon it provided with a double thread. The bearing of the shaft K, near its pulley J, is fixed or stationary, but its other bearing is in a sliding rod M, at the outer side of the framing A. Against the front end of this rod a spring $f$, bears and the back end of said rod is connected to the lower end of a bent lever or treadle N, which has a spring $g$, bearing against its upper part.

The upper part of lever N, at its end has a chain $h$, attached to it which is connected to a shaft O, placed longitudinally on the framing A, in suitable bearings and having a bevel toothed wheel P, on its front end which gears into a bevel pinion $i$, on the lower part of a vertical shaft Q, which also has upon it a toothed wheel $j$, which gears into a wheel R, on the framing A. The wheel R, has a bevel pinion $k$, attached concentrically to it and this pinion gears into a corresponding pinion $l$, on a tumbling rod S, placed longitudinally and centrally on the framing A, and provided at its end with a universal joint $m$, to which the draw-head T, is attached by a pin $n$, as shown clearly in Fig. 4, and the back part of the joint $m$, is fitted in a bearing $o$, which is attached to a spring $p$, the upper part of which is connected to a plate $q$, provided with vertical guide pins $r$, $r$, which pass through the horizontal plate $s$, of a support U, on the framing, said plate $s$, having a screw $t$, passing through it which screw also passes through the plate $q$, and admits of the latter, and consequently the draw-head, being adjusted higher or lower as may be desired to suit the height of the draw-head of an adjoining car. The spring $p$, in connection with the universal joint admit of all necessary play or vibratory movement that the draw-head T, should or may have under the motion of the cars.

On the upper part of the vertical shaft Q, there is cut a screw $u$, which gears into a small worm-wheel $v$, on a shaft $w$. This worm-wheel and shaft are inclosed within a cylindrical case R, which has a dial-plate $a'$, within it and covered by a glass. One end of the shaft $w$, is provided with an index $b'$, which traverses over the dial-plate $a'$, the latter being graduated into twelve equal parts like the dial of a clock, see Fig. 6.

The above-described parts constitute the means employed for applying the power to the brakes and releasing the same and I will, in order to avoid confusion describe the operation of the same, before describing the brake and its operation.

The power is applied through the driving wheel C, by the engineer who actuates the lever E, so that the friction wheel F, will be pressed against the tread of the wheel C. It will be seen that the universal joint $b$, of the shaft E″, admits of this adjustment of the wheel F, and said shaft E″, is rotated in consequence and a rotary motion communicated therefrom to the shaft K, by the bands I, and the screw L, of shaft K, rotates the wheel R, said screw being kept engaged with wheel R, by means of the springs $f$, $g$. The tumbling rod S, it will be seen, is rotated from the wheel R, by means of the bevel gears $k$, $l$, and the brakes, hereinafter described, are operated by the rotation of said tumbling rod. The vertical shaft Q, is also rotated from wheel F, through the medium of the wheel $j$, and the revolutions of the tumbling rod S, and consequently the degree of pressure of the brakes on the wheels are indicated on the dial-plate $a$; by the index $b'$. As the shaft Q, is rotated motion is communicated therefrom to the horizontal shaft O, by the bevel gears P, $i$. and as the shaft O, is rotated the chain $h$, is wound around it and the lever N, actuates the sliding rod M, and shaft K, so as to gradually throw the screw L, out of gear with wheel R. It will be seen therefore that the brakes can only be applied to a certain degree and it is designated that the minimum pressure shall be indicated by 12, on the dial plate. By this arrangement therefore the engineer cannot by any inadvertence or carelessness cause an undue application of the brakes. The brakes however although they cannot exceed a certain pressure in their application to the wheels can be regulated or graduated as desired below the maximum to the minimum by reversing the movement of the screw L, which is done by the engineer actuating the lever E′, and thereby throwing the friction wheel G, in contact with the tread of the driving wheel C, and the friction wheel F. Thus the brakes may be wholly taken off or in part as circumstances may require. And in case a train should be fully broke up or stopped with the brakes applied to the wheels, the engineer can instantly take off the brakes by depressing the lever N, with his foot. The taking off of the brakes therefore may be accomplished while the cars are at rest as well as in motion. It is essential that the index $b'$, be at the minimum point 12, on the dial-plate $a'$, when the brakes are not applied.

The brake is constructed and arranged as follows:

V, is a tumbling rod which is fitted in suitable bearings longitudinally and centrally on the framing B, and has a universal joint $c'$, at each end to which the draw-heads are attached. These universal joints $c'$, are supported by adjustable and elastic bearings X, arranged in the same way as that previously described and pertaining to the tumbling rod S. The tumbling rod V, has a bevel pinion $d'$, on it which gears into a horizontal bevel wheel Y, on the framing B, and into this wheel Y, there also gears a pinion Z, which is on the inner end of a horizontal shaft A′, having a crank-wheel A$^\times$ at its outer end, as shown in Fig. 2. This shaft A′ has an indicator B′ connected with it which is precisely the same as the one previously described and connected with the shaft Q.

C′, is a lever which has its fulcrum pin $e'$, on the framing B, and is connected at one end by a chain $f'$, and rod $g'$, to a shaft D′, which is at one end of the framing and has a worm wheel $h'$, upon it. The lever C′, is also connected at about its center to a hub of wheel Y, by a chain E$^\times$ and said lever has a spiral spring F′, connected to it at the end opposite to that which has the rod $g'$, attached to it. A spring G′, also bears against the lever C,′ as shown in Fig. 2, and on the lever there are placed two pulleys $h''$, $h''$, one at each side of its fulcrum pin around which a chain H′, passes. One end of this chain H′, is connected to a rod I′, the outer end of which is attached to a lever J′, the fulcrum pin of which passes into a pendant $i'$, of the framing B. The lever J′, has two pulleys $j'$, $j'$, attached to its under surface around which a chain K′, passes the ends of which are attached to brake-bars L′ L′, having shoes M′ at their ends. The opposite end of the chain H′, is connected to a rod N′, which is provided with a swivel $k'$ having a spring $l'$ within it as shown in Fig. 2. The outer end of the rod N′ connected to one end of a lever O′ the fulcrum pin $m'$, of which is attached to the outer brake bar P' at the opposite end of the framing B, and at the end of lever O' opposite to the end where the rod N' is attached there is connected a rod Q' which is attached to a brake bar R'. The brake bars P' R' are provided with shoes M''.

The brake bars L' L' are at opposite sides of one pair of wheels and the brake bars P' R' at opposite sides of the other pair, and it will be seen by referring to Fig. 2, that by drawing the lever C' in the direction indicated by the arrow 1, the brake bars will be simultaneously acted upon and the shoes M' M' M'' M'', thereof pressed against the wheels and, owing to the arrangement of the levers as described, with an equal pressure against each wheel an essential feature in a railroad car-brake.

S' is a shaft the lower end of which is stepped in a horizontal plate n' connected with the framing B. This shaft is not only allowed to rotate freely in its step or bearing but is also allowed to be adjusted laterally either to the right or left. On this shaft S' there is placed a screw T' and the upper end of the shaft is fitted in a segment slide U' which works in a segment guide V' attached to the framing and has a spring o' bearing against one end of it, said spring having a tendency to keep the screw T' in gear with the worm wheel h' of the shaft D' as shown clearly in Fig. 3. To the segment guide V', there is attached a spring stop p', by which the screw T' may be held out of gear with the worm-wheel h', and in gear with a worm wheel q', in the tumbling rod V, as will be fully understood by referring to Fig. 3.

The upper end of the shaft S' has a pinion W' on it which gears into a toothed wheel X', on a small upright shaft r' which has its bearing in the slide U'. On this shaft r' above the wheel X' there is placed a hand wheel Y'.

From the above description it will be seen that when the tumbling rods of a series of cars are connected that all the brakes thereof may be simultaneously applied and taken off by the engineer actuating the levers E, E, previously described. The levers C' of each car being moved through the medium of the wheels Y, and bevel pinions d' all of which of the several cars are of the same dimensions so as to insure an equal rotation of the tumbling rods of the several cars.

It will be seen that the draw-heads of the tumbling rods have a square recess or interior and that square links or shackles A'', are employed to fit into them see Fig. 4, in order to insure the rotation of the several tumbling rods. This feature however forms no part of this invention as it is shown in a brake recently patented by me. When the tumbling rods are returned in the direction to take off the brakes, the springs F', G' throw back the levers C' to relieve the wheels.

At any time when necessary or desired the brakeman on the cars may operate the brakes by adjusting the shafts S' so that their screw T' will gear into the worm-wheels q' on the tumbling rods of the several cars the brakeman then turning the hand wheels Y' and when the brake of a car is to be operated separately the brakeman withdraws the spring stop p' and the spring o' will throw the screw T' in gear with the worm wheel h' of the shaft D' and cause the chain f' to be wound up on shaft D' thereby actuating the lever C'. The screw T' should never be left in connection with the worm-wheels of the tumbling rods. After each hand or manual operation of said rods, the segment slides U' should be released and the screw T' allowed to gear into the worm-wheels h' of the shafts D'. This separate hand application of power is necessary in order that a train of cars or individual cars may have the brakes applied when the locomotive is detached from them. This is of course very frequently done as in cases where cars are switched off on turnouts or branch tracks. As each car is provided with an indicator it will be seen that the state or condition of the brakes of each car is made known to the brakeman as well as to the engineer and in order to have the indicators of the several cars all operate precisely alike the gearing which move the several indexes should all be precisely of the same dimensions, and previous to the starting of a train of cars it should be the duty of the engineer or brakeman to see that the indicators have their indexes all at the minimum points and this may be effected by turning the shafts A' through the medium of the crank wheels A$^\times$.

I would remark that the band I, which connects the two shafts E'', K, may be dispensed with and gearing B$^\times$ substituted therefor as shown in Fig. 5, the latter however is merely an equivalent of the former.

I would further remark that in order to admit of the cars working freely on their springs without interfering with the operation of screw T', the shaft S' may be made with a slide so that it may adapt itself to the spring of the car. Various plans however may be devised for effecting this result.

Having thus described my invention what I claim as new and desire to secure by Letters Patent, is—

1. The burr or friction wheels F, G, arranged in relation with each other and the driving wheel C, of the locomotive as shown and the shaft E'', K, provided with universal joints b, e, and connected by the band I, or gearing, in combination with the screw L, on shaft K, and the lever or treadle N, connected with the shafts K, and O, all arranged to operate with the tumbling rod S, substantially as and for the purpose herein set forth.

2. The indicator formed of the index $b'$, traversing over a properly graduated dial-plate $a'$, and operated from the tumbling rod S, as shown, or in any equivalent way, to indicate the position or state of the brakes as herein described.

3. The combination and arrangement of the levers $C'$, $J'$, $O'$, chains $H'$, $K'$, and rods $I'$, $N'$, as shown for transmitting the power to the brake bars $L'$, $L'$, $P'$, $R'$.

4. The adjustable shaft $S'$, provided with the screw $T'$, arranged with the segment slide $U'$, or its equivalent and connected with the shaft $r'$ of the hand wheel $Y'$, in combination with the worm wheel $q'$, on the tumbling rod V, and the shaft $D'$, provided with the worm-wheel $h'$, and connected with the lever $C'$, as shown substantially as and for the purpose herein set forth.

A. J. AMBLER.

Witnesses:
 SAM W. SOULE,
 M. McMICKLE.